Nov. 16, 1965     W. K. KINDLE ETAL     3,218,640
POSITIONAL CONTROL SYSTEM
Filed Nov. 20, 1961                                 6 Sheets-Sheet 1

INVENTORS.
WILLIAM K. KINDLE
JOSEPH F. BRYAN
THOMAS Z. SMIDOWICZ
JEROME D. KENNEDY

BY *E. A. Petters*

ATTORNEY 3,218,640
POSITIONAL CONTROL SYSTEM
William K. Kindle, West Long Branch, Joseph F. Bryan, Oceanport, and Thomas Z. Smidowicz, West Long Branch, N.J., and Jerome D. Kennedy, Ann Arbor, Mich., assignors to Electronic Associates, Inc., Long Branch, N.J., a corporation of New Jersey
Filed Nov. 20, 1961, Ser. No. 153,400
11 Claims. (Cl. 343—7)

This invention relates generally to electrical control systems, and, more particularly, to an electrical control system for positioning a local radar system or the like on-target in response to target position intelligence received from a remote target-tracking site.

It is customary to provide one or more radar systems at each of a plurality of tracking sites along the length of a missile range or the like for purposes of observing or tracking a missile or other target while it is in flight. The various tracking site locations are usually determined by overlapping slightly the tracking range of adjacent radar systems to provide continuity of target contact throughout the geographic confines of the range. This continuity of target contact is obtained by slaving a presently non-tracking system to an adjacent tracking system and by providing the non-tracking system with site oriented target position signals while the target is passing through the overlapping tracking range.

The usual radar system obtains target position intelligence in a polar coordinate form, i.e., in the form of electrical signals which correspond to the target range and to the elevation and azimuth angles of the radar system scanner relative to the radar base. Since it is difficult and costly to transform or correct polar data for an adjacent site, and since Cartesian coordinate data is usually required at a tracking site for application to conventional plotting or display devices, it is customary in some systems to first convert the polar target signals into Cartesian coordinate signals and then transmit Cartesian coordinate signals to the adjacent radar system site. The received Cartesian coordinate signals are then usually converted to a site-oriented polar coordinate form and applied to the slaved radar system for positioning it on-target in terms of azimuth, elevation and range. Since within a missile range each radar system may be required to function as a tracking station as well as a slaved station, it becomes necessary to provide each system with polar-to-Cartesian as well as Cartesian-to-polar coordinate conversion apparatus.

The conversion of polar coordinate signals to rectangular coordinate signals, and vice-versa, is conventionally performed by well-known trigonometric transformations which employ suitable transducers such as electro-mechanically actuated sine and cosine potentiometers. The sine and cosine potentiometers which form part of the radar system are normally used to convert the target position electrical signals from a polar to a Cartesian form. Additional sine and cosine potentiometers are usually provided independently of the radar system to convert electrical signals from a Cartesian to a polar form.

Although Cartesian-to-polar transformations may be performed with extreme accuracy, in practice small but significant errors are introduced into these transformations because of slight inherent inaccuracies which exist in the potentiometers and the servo-resolvers which position these potentiometers. Consequently, there is at times a significant loss in the accuracy of target position data transmitted to the slaved radar system. Since the pointing accuracy of the slaved radar system scanner is a direct function of the applied signals, which may be inherently inaccurate, under certain conditions of operation the slaved radar system does not acquire the target and it is lost while in flight. A logical solution to this problem, while utilizing the same or similar apparatus, would be to improve the accuracy of Cartesian-to-polar transformations by improving the accuracy of the servo resolvers and the potentiometers which they drive. Such an approach is considered feasible, but the present development of the art prohibits such an approach because of the expensive equipment which would be involved.

The present invention is directed to a radar target positioning system of greatly improved accuracy which dispenses entirely with the use of Cartesian-to-polar coordinate conversion equipment as it is presently known and used in the art. In its preferred form, the present invention utilizes the usual range, elevation and azimuth potentiometers provided at a local or slaved radar system for generating Cartesian coordinate electrical signals which define the position of a real or imaginary target the radar system may presently observe. The corresponding range, elevation and azimuth potentiometers at a remote or tracking radar system are similarly employed to generate Cartesian coordinate electrical signals which define the position of a present target. The target position signals are delivered to the local radar system and are there compared to the corresponding locally generated Cartesian signals. Suitable comparing means derive difference or error signals from a comparison of the Cartesian signals and convert the difference signals to an equivalent polar coordinate form. The polar signals are thereafter applied to the appropriate servos at the local radar to effect corrective repositioning of the radar scanner and the range potentiometer. Repositioning of the radar scanner and range potentiometer causes corresponding variations in the locally generated polar signals, and, at the time when a comparison of the local and target Cartesian coordinate signals produces zero amplitude error signals, the local radar system is considered on-target and can then be placed into an automatic target-tracking mode. The radar system is conventionally operated in a target acquisition mode while it is being driven on-target.

In the present invention, the pointing angle of the slaved radar scanner and the setting of the slaved radar potentiometer are derived with extreme accuracy through the use of relatively inaccurate approximations of sine and cosine transformations. In the present invention, the only requirement for accurate pointing and accurate range adjustment is a condition of zero difference between the target and the local Cartesian coordinate signals. The sine and cosine functions may be represented or approximated by fixed amplitude square functions which suffer polarity reversals at some predetermined amplitude position of the represented functions. Relatively simple relay switching circuits, which in a preferred embodiment are constructed of solid state devices, such as diodes, transistors, or the like, may be utilized to effect polarity reversals of the square functions, thereby dispensing entirely with the use of the highly accurate servo resolvers and the highly accurate potentiometers used therein for Cartesian-to-polar signal transformations.

It is, accordingly, an object of the present invention to improve the accuracy with which a slaved radar system can be positioned on-target while greatly simplifying the apparatus to achieve this end.

It is another object of the present invention to position a slaved radar system on-target in response to error signals representing such differences as may exist between the position of the present target and the target position of the slaved radar system.

Another object of the present invention is to transform Cartesian coordinate signals into polar coordinate signals in the course of positioning a slaved radar system on-target while dispensing with the use of highly accurate apparatus for performing the signal transformations.

These and other objects, features, and advantages will become apparent from the following description taken in connection with the accompanying drawings wherein.

Figure 7:
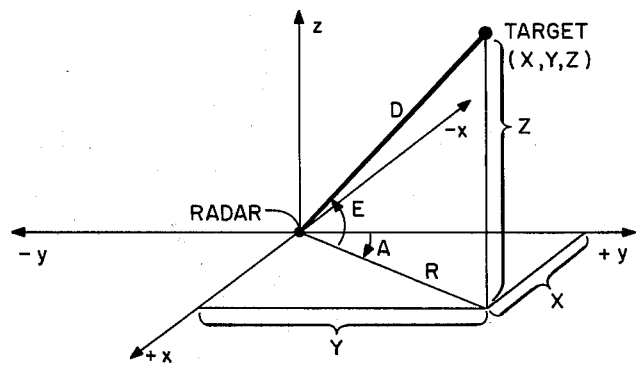
FIG. 7 is a geometrical diagram of a target acquisition problem.

In FIG. 7, three mutually perpendicular lines X, Y, and Z define three coordinate planes which meet at an origin O. A radar system 10 is normally located at the origin O. The lines X and Y are considered to define a plane which is tangent to the earth or radar site. The Y coordinate is considered to be oriented with respect to true north, as is conventional. A line D represents a slant-range vector from the radar system 10 to a target X, Y, Z and determines a pair of components R and Z which are in the same plane. Vector Z represents the height component of vector D above the tangent plane for a given elevation angle E, and vector R represents the horizontal range component of vector D for the same given elevation angle E. With a given azimuth angle A, the R component is transformed within the tangent plane into an east-west component X and a north-south component Y at a computer 11 which operates in conjunction with radar system 10 to produce electrical signals representing these components. The vectors just described may be replaced by electrical signals as follows:

(1) $X = D \cos E \sin A$
(2) $Y = D \cos E \cos A$
(3) $Z = D \sin E$
(4) $R = D \cos E$ As is well known, a conventional radar system derives target position information in the polar coordinate form of D, A, and E. These signals are usually transformed into a Cartesian coordinate form at the transducers 12, 14, and 16, shown in FIG. 2 to comprise potentiometers which are disposed at and comprise an integral part of the radar system 10. The brush of the linear range potentiometer 12 is coupled directly to and driven by a servo system 18. The brushes of sine-cosine potentiometers 14 and 16 are mechanically coupled for direct movement with a radar scanner 20, as is will known. Servo systems 22, 24 are in turn mechanically coupled to scanner 20 for rotating it respectively in elevation and azimuth angle relative to the radar system base.

Figure 2:
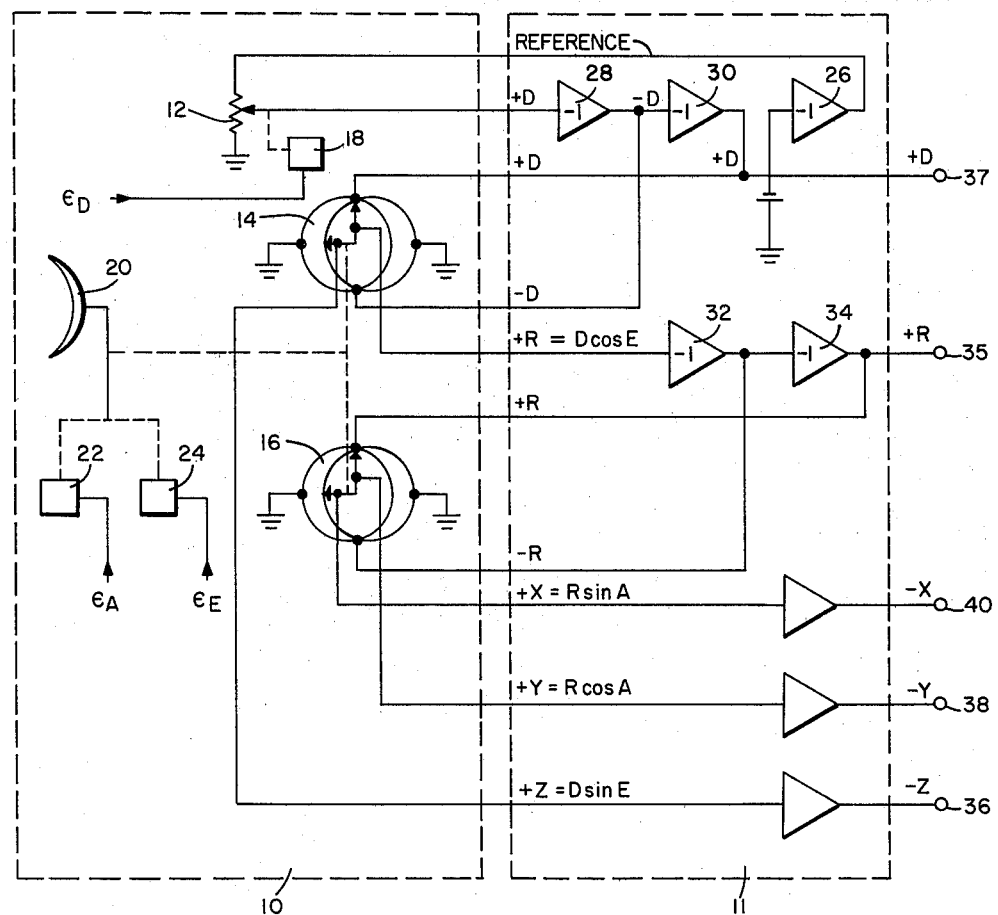
FIG. 2 is a schematic diagram of a polar-to-Cartesian coordinate converter which may be used with a positional control system according to this invention.

The computer or polar-to-Cartesian coordinate converter 11 may be of a conventional form and connected to the radar system 10 for performing the above described trigonometric transformations. In FIG. 2, a typical computer 11 is shown to comprise a plurality of operational amplifiers 26–34, each of which may operate as a phase-inverter, i.e., have a gain of −1. Amplifier 26 is connected to a source of potential and delivers a suitable reference, such as +140 volts to the ungrounded end of range potentiometer 12. Amplifiers 28 and 30 are connected in series, with amplifier 28 receiving an input signal from the brush of potentiometer 12, and deliver output signals of equal amplitude and opposite polarity to the input terminals of elevation potentiometer 14. The electrical signal appearing at the sine brush of elevation potentiometer 14 may be applied directly to output terminal 36 while the signal appearing at the cosine brush of this potentiometer is applied to the input terminal of amplifier 32. Amplifier 32 and amplifier 34, connected in series therewith, deliver signals of opposed polarity and of the same amplitude to the azimuth potentiometer 16. The output terminal of amplifier 34 and the output terminal of amplifier 30 may be further connected to output terminals 35 and 37 respectively. To complete the circuit of computer 11, connections are made from the sine and cosine brushes of azimuth potentiometer 16 to the output terminals 38 and 40. Isolation and phase inversion amplifiers may be povided between the potentiometers 14 and 16 and the terminals 36, 38, and 40 to present a low impedance output to a connected load.

In operation, the reference signal from amplifier 26 is altered in amplitude at the range potentiometer 12 to produce an output signal which is linearly related to the amplitude of the vector D. The D signals are applied to elevation potentiometer 14 and altered in amplitude in accordance with the sine and cosine of the elevation angle E. The potentiometer 14 yields a D.C. electrical signal which has an amplitude proportional to D sin E, or Z, and a D.C. electrical signal which has an amplitude proportional to D cos E, or R. The Z signal is applied to the terminal 36 and the R signal is applied to the azimuth potentiometer 16 via the amplifiers 32 and 34. Potentiometer 16 alters the amplitude of the input signal R in accordance with the azimuth angle A to yield R sin A, or X, at the terminal 40 and R cos A, or Y, at the terminal 38.

The D.C. Cartesian coordinate signals X, Y, and Z from a tracking radar, which define the position of a present target, are then applied to suitable transmitting means 42, FIG. 1, for transmission to a down-range radar system or other remote apparatus. A receiver for signals transmitted from another site is also provided at each radar and shown generally at 44. Since transmitted signals are usually oriented for the transmitting site, conversion means are usually required at the receiving site in order to properly orient the received signals. This means may take the form of conventional gross-parallax correction apparatus, not shown, which is well known in the art to perform this operation. Alternatively, the gross-parallax correction apparatus may be located at the tracking and transmitting site for correcting the X, Y, and Z Cartesian signals prior to their transmission.

The apparatus thus far described is considered conventional, and its operation is generally well known. In the discussion of the present invention which follows, since similar apparatus is provided at remote and local sites, similar reference numerals will be used throughout to identify similar apparatus. Data in the form of electrical signals from a remote target-tracking site will be identified with the subscript R. Electrical signals which are generated at a local radar location, to the extent that they are similar to received signals, will be identified with the subscript L. Moreover, since the parallax correction of transmitted and/or received signals is well known, all signals, whether from a remote or a local target-tracking site, will be considered to be properly oriented for the site under consideration.

Figure 1:
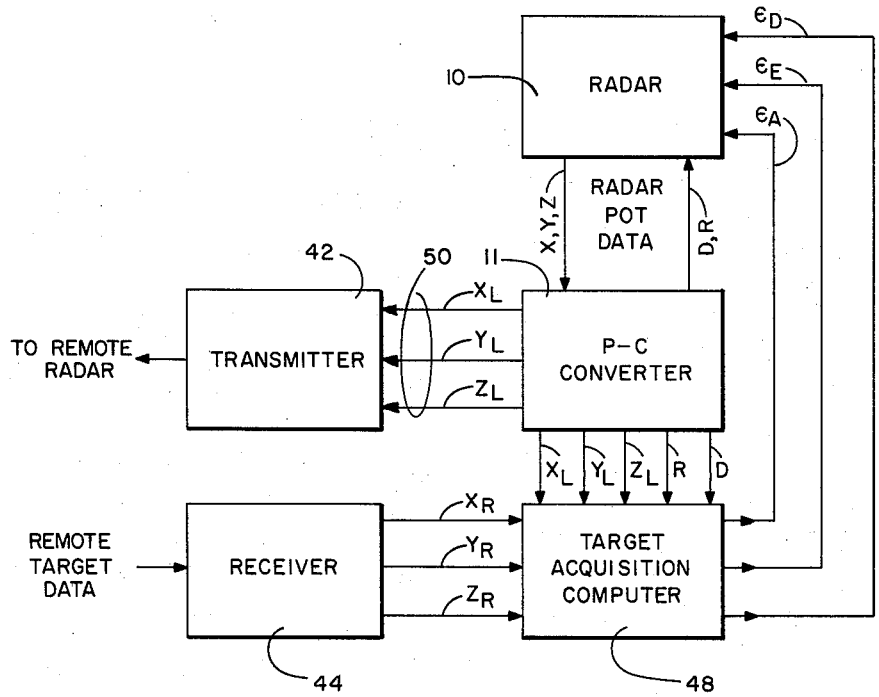
FIG. 1 is a block form diagram of a preferred embodiment of the present invention.

Turning now to FIGS. 1 and 7, a block form illustration of a preferred embodiment of the present invention is shown to comprise a radar 10 adapted for delivering output signals in the form of X, Y, and Z to a polar-to-Cartesian converter 11. The polar-to-Cartesian converter delivers electrical output signals to the radar 10 in the form of D and R, as heretofore described. The polar-to-Cartesian converter further delivers output signals in the form of $X_L$, $Y_L$, $Z_L$, R, and D to a target acquisition computer 48, which will be described in greater detail hereinafter, for purposes of positioning the radar 10 on-target. The D.C. Cartesian coordinate signals which correspond to $X_L$, $Y_L$, and $Z_L$ may be further applied to the conductors 50 for transmission by the transmitter 42 to another remote radar within the range. Remotely generated target position electrical signals in the Cartesian coordinate form of $X_R$, $Y_R$, and $Z_R$ are also delivered to the local site and applied to the target acquisition computer 48. The received Cartesian signals are compared to the corresponding locally generated Cartesian signals within the computer 48, and, if difference exists between their amplitudes, D.C. error signals are produced. The error signals are thereafter modulated, amplified, and switched within the computer 48 to produce the error correcting signals which are designated $\epsilon_D$, $\epsilon_A$, and $\epsilon_E$ and which are applied to the local radar range, azimuth, and elevation servo systems 18, 22 and 24, FIG. 2, for driving the local radar on-target. The range, azimuth, and elevation error correcting signals may be either A.C. or D.C. in dependence upon the type of servo systems which are used. In the present embodiment, the error correcting signals are considered to be A.C. and are obtained within computer 48 by solving the following equations:

(5) $\epsilon_D = (\epsilon_X \sin A + \epsilon_Y \cos A) \cos E + \epsilon_Z \sin E$.

(6) $\epsilon_A = \frac{1}{R}(\epsilon_X \cos A - \epsilon_Y \sin A)$.

(7) $\epsilon_E = \frac{1}{D}[\epsilon_z \cos E - (\epsilon_X \sin A + \epsilon_Y \cos A) \sin E]$.

Where:
(8) $\epsilon_X = X_L - X_R = D \cos E \sin A - X_R$.
(9) $\epsilon_Y = Y_L - Y_R = D \cos E \cos A - Y_R$.
(10) $\epsilon_Z = Z_L - Z_R = D \sin E - Z_R$.
(11) $R = D \cos E$.

In deriving Equation 6 it is well understood in the art that with no error in the azimuth angle that (11a) $X \cos A = Y \sin A$.

If there is an error in the angle such as to unbalance Equation 11a then (11b) $\epsilon_A = X \cos A - Y \sin A$.

Substituting Equations 8 and 9 in Equation (11b) there is obtained (11c) $\epsilon_A = \epsilon_X \cos A - \epsilon_Y \sin A$.

When $X_L = X_R$ and $Y_L = Y_R$ then the error in azimuth angle reduces to zero. In order to obtain a constant gain servo system Equation 11c is divided by the resolved vector R in the manner described in detail in "Control Engineers' Handbook," edited by J. G. Truxal et al., McGraw-Hill, 1958, at 6 –69, 70, et seq. In this manner, Equation 6 is obtained.

In a similar manner the equation for the elevation angle error of Equation 7 may be described by the well-known equation (11d) $\epsilon_E = R \sin E - Z \cos E$.

Also, it is known that the resolved vector R may be written (11e) $R = X \sin A + Y \cos A$.

Substituting Equation 11e in Equation 11d provides (11f) $\epsilon_E = (X \sin A + Y \cos A) \sin E - Z \cos E$.

Then, substituting Equations 8–10 in Equation 11f and then dividing Equation 11f by the resolved vector D derives Equation 7.

In deriving Equation 5 the vector D is obtained by the vector sum of the vector R and the vector Z as follows:

(11g) $\vec{D} = \vec{R} + \vec{Z}$.

or (11h) $D = R \cos E + Z \sin E$.

Substituting for R as defined in Equation 11e obtains the Equation (11i) $D = (X \sin Z + Y \cos A) \cos E + Z \sin E$.

Then, substituting Equations 8–10 in Equation 11i derives Equation 5. It will be noted that in Equation 5 the sum of the errors thus obtained is equal to the error in slant range $\epsilon_D$.

A partial solution to Equations 8, 9 and 10 and a complete solution to Equation 11 is obtained directly from the converter 11; the values of $X_L$, $Y_L$, $Z_L$ and R are obtained at the terminals 35, 36, 38 and 40.

Taking the partial derivative of Equation 5 with respect to D, the partial derivative of Equation 6 with respect to A, and the partial derivative of Equation 7 with respect to E yelds:

(12) $\frac{\delta \epsilon_D}{\delta_D} = 1$

(13) $\frac{\delta \epsilon_A}{\delta_A} = \frac{1}{R}(X_R \sin A + Y_R \cos A) \approx 1$

(14) $\frac{\delta \epsilon_E}{\delta_E} = \frac{1}{D}[(X_R \sin A + Y_R \cos A) \cos E + Z_R \sin E] \approx 1$ From Equations 12, 13 and 14, it is apparent that the loop-gain of the present system is constant, provided, however, that R and D are introduced into the computation of $\epsilon_A$ and $\epsilon_E$ as feedback or automatic gain control components. Under these conditions of operation, the radar system will track uniformly through its range. The sine and cosine multiplications which are performed in the computations of $\epsilon_D$, $\epsilon_A$, and $\epsilon_E$ from $\epsilon_X$, $\epsilon_Y$, and $\epsilon_Z$ need not be of high accuracy since they affect only the gain of the system and do not otherwise affect the pointing accuracy of the radar scanner and the range determination of the system. By tolerating moderate gain variations within the system, it becomes practical to replace sine and cosine potentiometers with switching circuits to approximate the multiplications which they perform.

Figure 3:
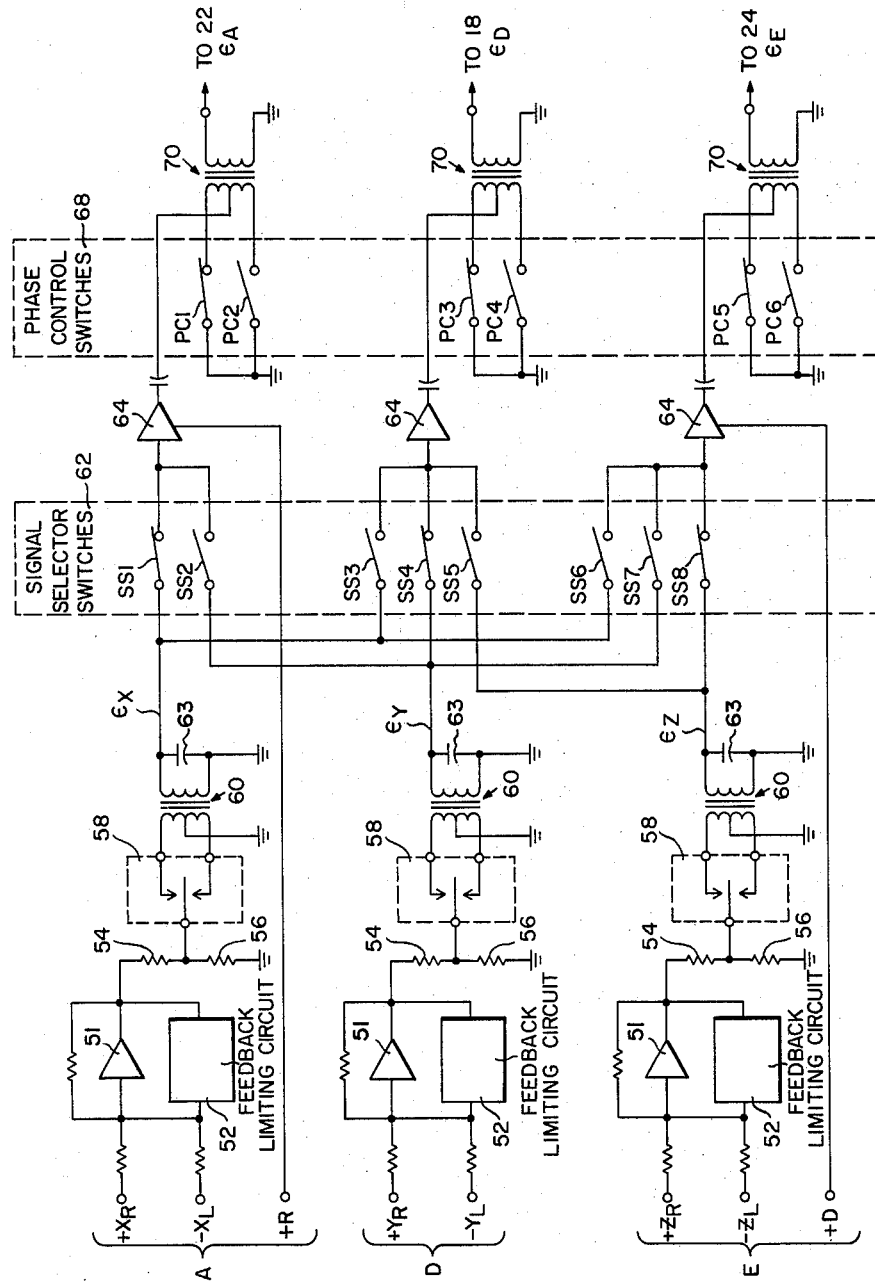
FIG. 3 is a schematic diagram of a target acquisition computer according to the present invention.

The target acquisition computer 48 is shown schematically in FIG. 3 and comprises three substantially identical channels D, A, and E for performing the calculations according to Equation 5, 6 and 7. Channel D computes the A.C. range error correcting signal $\epsilon_D$ for application to the range servo system 18. The A channel computes the A.C. azimuth angle error correcting signal $\epsilon_A$ for application to the azimuth angle servo system 22. Channel E computes the A.C. elevation angle error correcting signal $\epsilon_E$ for application to the elevation angle servo system 24. To this end, channel A receives input signals which correspond to $+X_R$, $-X_L$ and $+R$; channel D receives input signals which correspond to $+Y_R$ and $-Y_L$; and channel E receives input signals which correspond to $+Z_R$, $-Z_L$, and $+D$.

For convenience, the input signals for computer 48 are taken directly from the terminals 35, 36, 37, 38 and 40 at the local converter 11. The $X_R$, $Y_R$ and $Z_R$ signals are taken from corresponding terminals 36, 38 and 40 at the remote converter 11 for application to the remote radar transmitter 42. In the present embodiment the remote signals are considered to suffer polarity reversals in addition to being parallax corrected for the local or receiving site. Thus, as received at the local site, each remote signal has a polarity which is opposite to that of each corresponding locally generated signal within any given quadrant of target position. This choice of polarities for the input signals to channels A, D and E is somewhat arbitrary, but it enables the present embodiment of computer 48 to obtain algebraic differences of corresponding remote and local signals without requiring additional phase inversion apparatus. Those skilled in the art will recognize that with the use of appropriate phase inversion apparatus, other polarities of input signals will do equally as well. Since the structure and operation of the three channels is substantially the same with the exception of the applied input signals, the detailed description of structure and operation will be confined to one channel, namely, channel A. From this description, the operation of the other channels should become obvious.

The opposite polarity input signals $+X_R$ and $-X_L$ for channel A are summed at the input terminals of an amplifier 51. A D.C. voltage output signal is produced by this amplifier which represents the algebraic difference of the amplitudes of the input signals. A feedback limiting circuit 52, comprising diodes or the like, is connected between the amplifier summing junction and output terminal and provides limiting of the amplifier output signals to some preselected maximum amplitude. A pair of serially connected resistors 54, 56 connect the output of amplifier 51 to ground. A connection from the common junction of the resistors 54, 56 delivers the output signal from amplifier 51 to the moving contact of a suitable modulator 58. Resistors 54, 56 serve to limit the amplitude of the current which will flow through the contacts of the modulator.

Modulator 58 may be of any suitable form, such as an electromechanical or solid state device, and is shown to comprise a pair of stationary contacts which cooperate with the moving contact to convert a D.C. potential from the juncture of resistors 54, 56 into a pulsating direct current potential. The modulator moving contact may be driven by a suitable field coil, not shown, which is supplied with an alternating current potential of suitable frequency, e.g., 60 cycles per second. In order to synchronize the output signals from channels A, D and E with the usual reference signals applied to the radar system servo motors, the field coil of modulator 58 may be supplied with exciting potential from the A.C. reference source, not shown, for the servo systems 18, 22 and 24.

The stationary contacts of modulator 58 are connected to opposed ends of the primary winding of a transformer 60. This primary winding may include a conventional grounded center-tap. One side of the secondary winding of transformer 60 is connected directly to one side of a switch SS1. Switch SS1 is shown to be disposed within a signal selector switching unit 62, comprising the switches SS1–SS8. The other side of the secondary winding of the transformer is shown to be connected to ground. A capacitor 63 is connected across the secondary terminals of the transformer 60 to shape the square wave output to approximate a sinusoid. Thus, the signal appearing at the secondary of transformer 60 will be an A.C. signal, the amplitude of which is proportional to the algebraic difference of $X_R$ and $X_L$, $\epsilon_X$ in Equation 8. Similarly, the amplitude of the A.C. output from the transformer 60 in channel D will be proportional to the algebraic difference of $Y_R$ and $Y_L$, $\epsilon_Y$ in Equation 9. The algebraic difference of $Z_R$ and $Z_L$, $\epsilon_Z$ in Equation 10, is produced at the secondary of the transformer 60 in channel E.

The A.C. error signals $\epsilon_X$, $\epsilon_Y$ and $\epsilon_Z$ which appear at the secondaries of transformers 60 are each applied to the signal selector switching unit 62 and switched thereby to the input terminals of one or more of the amplifiers 64. The switching action of unit 62 will be covered in greater detail in conjunction with FIG. 4. The error signal applied to A channel amplifier 64 is then divided by the channel A input signal R according to Equation 6. Since any well-known gain-control circuit will achieve this end, its details are not believed essential to an understanding of the invention and are therefore not shown. The $\epsilon_Z$ error signal which is applied to the channel E amplifier 64 is divided by a channel E input signal D according to Equation 7.

The output signals from each of the amplifiers 64 are capacitor coupled to a corresponding transformer 70. The transformers 70, in turn, couple the output from each amplifier 64 to a corresponding one of the servo systems 18, 22 or 24, via the phase control unit 68. Phase control unit 68 comprises the switches PC1 through PC6, and will be described in greater detail in conjunction with FIG. 4. In FIG. 3, a pair of the switches PC1–PC6 are shown to be connected to opposite ends of the primary winding of each transformer 70. Each primary winding is center-tapped and has applied thereto an input signal from the corresponding amplifier 64. Phase reversals of the output signal from each transformer 70 is achieved by the operation of the switches PC1–PC6. To this end, each pair of the switches PC1–PC6 have a common connection to ground for grounding either end of the primary windings of the transformers 70.

Figure 4:
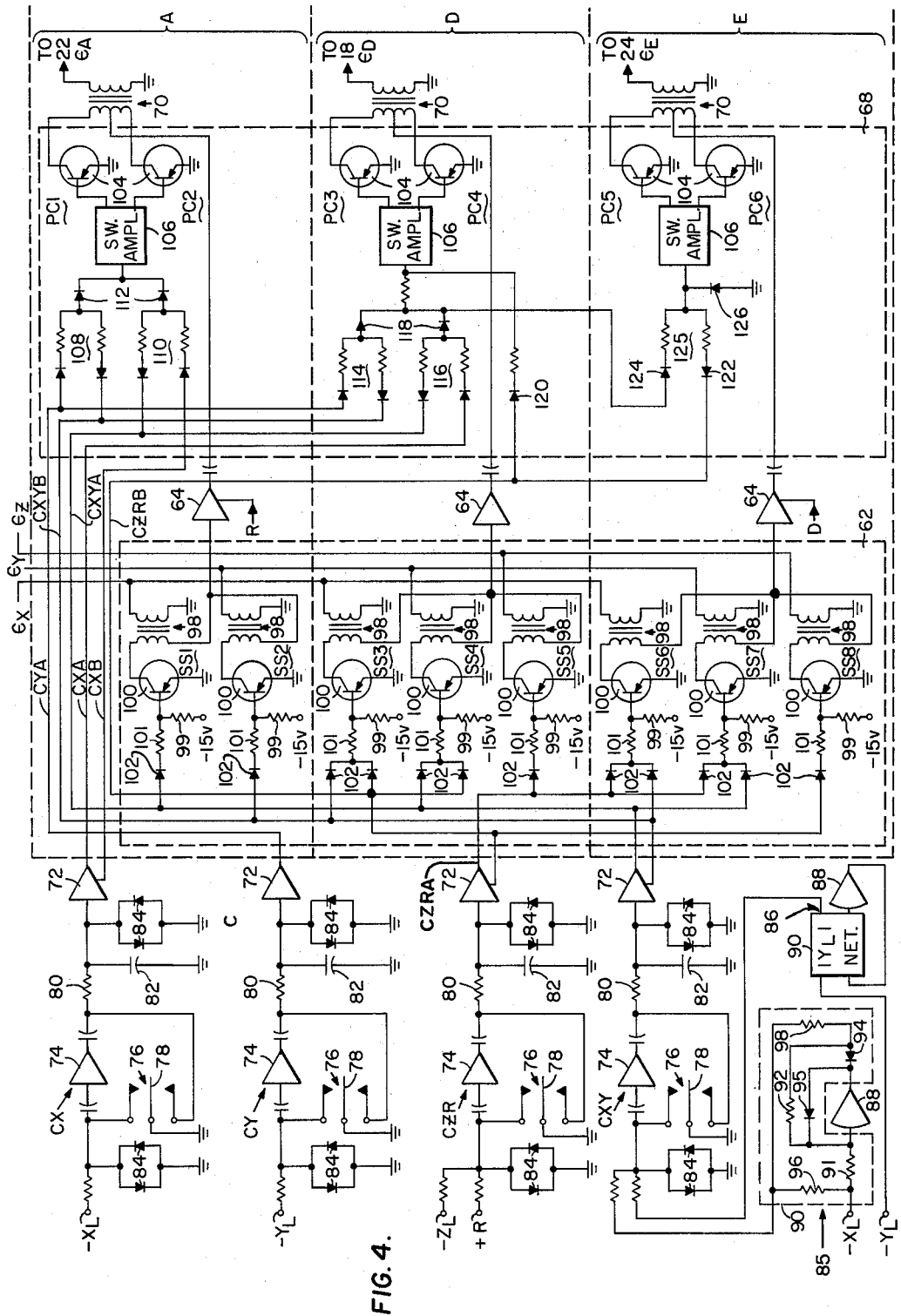
FIG. 4 is a further detailed schematic diagram of a portion of the computer of FIG. 3.
Figure 5A:
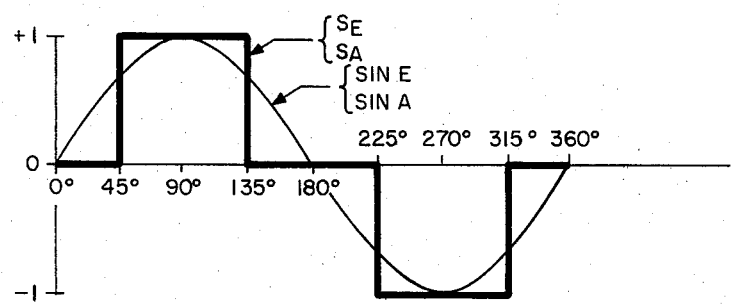
FIGS. 5a and 5b are an aid in the understanding of FIGS. 3 and 4 and illustrate graphically certain functions which are generated thereby.
Figure 5B:
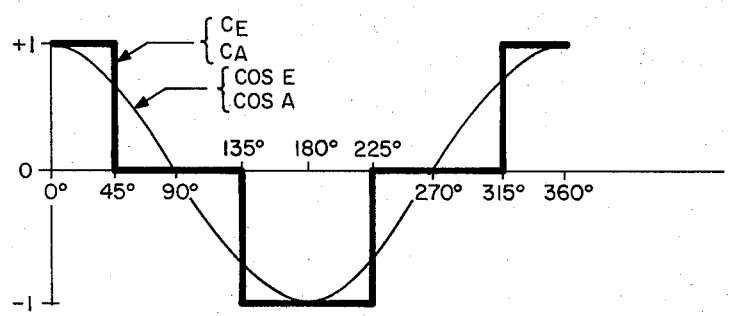

The operation of the circuit of FIG. 4 is predicated upon the approximation of sine and cosine functions by the square functions shown in FIGS. 5a and 5b. In FIGS. 5a and 5b, the approximations of the sine and cosine functions are seen to have amplitude transitions each 90°, occurring at 45°, 135°, 225°, and 315°. These particular approximating functions were selected somewhat arbitrarily with a maximum amplitude of unity (1); should a finer or more nearly accurate approximation of the functions be required, the amplitude transitions could be selected to occur each 45° or less. The approximating functions $S_A$, $C_A$ in FIGS. 5a and 5b correspond respectively to the sine and cosine of the azimuth angle A; $S_E$, $C_E$ correspond respectively to the sine and cosine of elevation angle E.

The values of $S_A$ and $C_A$ are tabulated below for each 90° sector of the azimuth angle.

Table 1

| Sector | $S_A$ | $C_A$ |
|---|---|---|
| 045°–135° | +1 | 0 |
| 135°–225° | 0 | −1 |
| 225°–315° | −1 | 0 |
| 315°–045° | 0 | +1 |

Since the scanner of the usual radar system is limited to approximately 90° of movement in elevation angle, i.e., from the horizontal to the vertical plane, it is necessary to consider elevation angle variations only from below 0° through 90°. In Table 2, below, $S_E$ and $C_E$ are shown to have one transition in amplitude which occurs at 45°.

Table 2

| Sector | $S_E$ | $C_E$ |
|---|---|---|
| (−) 045°–045° | 0 | +1 |
| 045°–135° | +1 | 0 |

When $S_A$, $C_A$, $S_E$ and $C_E$ are substituted for sine A, cosine A, sine E, and cosine E in Equation 5, the error in slant range, $\epsilon_D$, may be defined in terms of $\epsilon_X$, $\epsilon_Y$ and $\epsilon_Z$ within each 90° sector as follows:

Table 3

| | Azimuth Angle Sector | Elevation Angle Sector |
|---|---|---|
| $\epsilon_D = \epsilon_X$ | 045° ≤ A ≤ 135° | |
| $\epsilon_D = -\epsilon_Y$ | 135° ≤ A ≤ 225° | |
| $\epsilon_D = -\epsilon_X$ | 225° ≤ A ≤ 315° | −45° ≤ E ≤ 45° |
| $\epsilon_D = \epsilon_Y$ | 315° ≤ A ≤ 045° | |
| $\epsilon_D = \epsilon_Z$ | 000° ≤ A ≤ 360° | 45° ≤ E ≤ 135° |

Similarly, the error in azimuth angle error, $\epsilon_A$, may be defined in terms of $\epsilon_X$, $\epsilon_Y$, $\epsilon_Z$ and R from Equation 6 as follows:

Table 4

|  | Azimuth Angle Sector |
|---|---|
| $\epsilon_A \approx \epsilon_Y/R$ | $045° \leq A \leq 135°$ |
| $\epsilon_A \approx -\epsilon_X/R$ | $135° \leq A \leq 225°$ |
| $\epsilon_A \approx -\epsilon_Y/R$ | $225° \leq A \leq 315°$ |
| $\epsilon_A \approx \epsilon_X/R$ | $315° \leq A \leq 045°$ |

Error in elevation angle, $\epsilon_E$, may also be defined in terms of $\epsilon_X$, $\epsilon_Y$, $\epsilon_Z$ and D by similar substitutions in Equation 7.

Table 5

|  | Azimuth Angle Sector | Elevation Angle Sector |
|---|---|---|
| $\epsilon_E \approx \epsilon_Z/D$ | $000° \leq A \leq 360°$ | $-45° \leq E \leq 45°$ |
| $\epsilon_E \approx -\epsilon_X/D$ | $045° \leq A \leq 135°$ | |
| $\epsilon_E \approx \epsilon_Y/D$ | $135° \leq A \leq 225°$ | $45° \leq E \leq 135°$ |
| $\epsilon_E \approx \epsilon_X/D$ | $225° \leq A \leq 315°$ | |
| $\epsilon_E \approx -\epsilon_Y/D$ | $315° \leq A \leq 045°$ | |

From Tables 3–5 it becomes apparent that the polar coordinate error correcting signals $\epsilon_A$, $\epsilon_D$ and $\epsilon_E$ can be obtained or approximated directly from the error signals $\epsilon_X$, $\epsilon_Y$, $\epsilon_Z$. The signals D and R are used in these derivations of the error correcting signals only for purposes of gain control. The circuit of FIG. 4 achieves this end by the appropriate polarization of the error signals through the identification and selection of the sectors in which the azimuth and elevation angles occur. In FIG. 4, the signal selector switch unit 62 and the phase control unit 68 are shown to be operated in conjunction with the amplifiers 64 and the transformers 70 in each of the channels A, D and E. The square function approximations of the sine and cosine functions are generated by these circuits which operate in conjunction with the four comparator circuits shown in the left hand portion of FIG. 4 and which are designated CX, CY, CXY and CZR.

Figure 6:
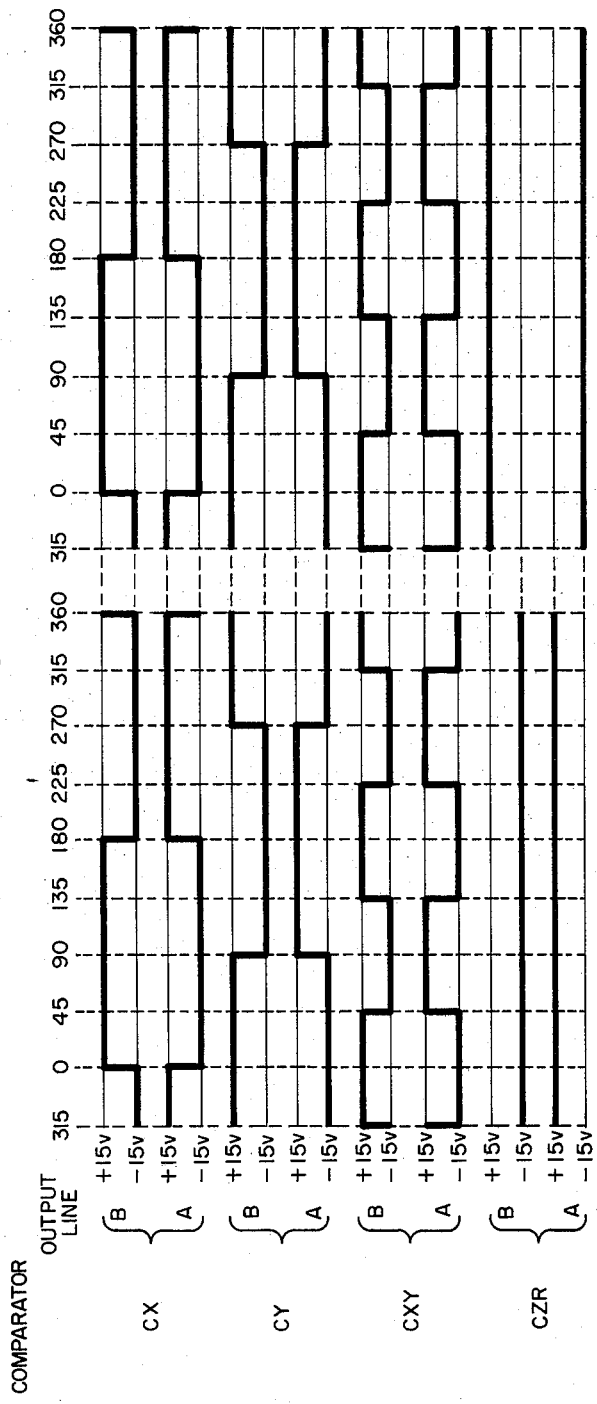
FIGS. 6a and 6b illustrate graphically certain other functions generated by the apparatus of FIGS. 3 and 4.

Each of the comparator circuits includes a conventional amplifier 72 which is capable of producing a push-pull output, i.e., a signal of constant amplitude and of one or an opposite polarity in response to the polarity of the applied input signals. In the present embodiment, the levels of which are shown in FIGS. 6a and 6b the output signals from the comparators are selected to be either +15 volts or −15 volts. In FIG. 4, the output signal lines from the comparators are identified with the comparator designation followed by an A or a B. Each amplifier 72 is preceded by a preamplifier 74 in order to extend the operating range of the comparators to accept extremely low amplitude input signal. The amplifier 74 may be capacitor coupled to and operate in conjunction with a synchronous vibrator-rectifier 76 having a grounded armature 78 and a field coil, not shown. The field coil may be supplied with an A.C. voltage of suitable frequency, e.g., 60 cycles per second. The armature 78 cooperates with a pair of stationary contacts, one of which is connected directly to the input side of the input capacitor for amplifier 74 and the other of which is connected directly to the output side of the output capacitor for amplifier 74. The input signals to the preamplifier 74 are thus modulated, amplified, and thereafter synchronously demodulated and applied to the input terminals of a corresponding amplifier 72 via a conventional filter circuit comprising a resistor 80 and a capacitor 82. To complete the circuit of the comparators, a pair of similar diodes 84 are connected back-to-back at the input and output of each amplifier 74 for purposes of limiting the amplitude of the input and the output signals.

Each of the comparators have their input terminals connected to receive input signals directly from the polar-to-Cartesian coordinate converter 11, FIG. 1. Comparator CX has applied thereto the D.C. signal $X_L$; comparator CY receives the D.C. signal $Y_L$ as an input signal. The D.C. signals $Z_L$ and R are applied to converter CZR as a differential input. The D.C. signals $X_L$ and $Y_L$ are applied to converter CXY as a differential input, but for reasons hereinafter made apparent, they first require further modification at the absolute value circiuts 85 and 86. Circuit 85 is similar to circuit 86, and each comprises an amplifier 88 operating in conjunction with a similar network 90.

Each network 90 may comprise an amplifier input resistor 91 and an amplifier feedback resistor 92. A negative current conducting diode 94 is connected between the output terminal of amplifier 88 and the resistor 92. A similarly poled diode 95 is connected in shunt to the amplifier 88. A resistor 96 has one end connected to the input side of resistor 91 and another end connected to one end of a resistor 98. The other end of resistor 98 is connected to the juncture of resistor 92 and diode 94. The juncture of resistors 96, 98 is considered to be the output terminal of the absolute value circuit and current signals are delivered therefrom to the comparator CXY.

With negative input signals applied to the absolute value circuit 85, the diode 95 will conduct, amplifier 88 will be disabled, and negative current of a predetermined amplitude will flow through the resistor 96. When a positive input signal of this same amplitude is applied to the circuit 85, resistor 96 will conduct the same predetermined amplitude of current, but of opposite polarity. In this condition, diode 95 will not conduct and because of phase reversal of the input signal, diode 94 will conduct. Resistors 91, 92 and 98 have such values relative to one another as to produce a current through resistor 98 which has twice the amplitude of the current flowing through resistor 96. Thus, with a positive input signal, the currents through resistors 96, 98 will be added algebraically at their juncture to produce a negative current of the same amplitude as that which flows through resistor 98 upon application of negative input signals of the corresponding amplitude. Accordingly, the output from this circuit is always positive, irrespective of the polarity of the input signal $X_L$.

The network 90 which is associated with the circuit 86 is similar to the circuit 90 which is associated with the circuit 85 with the exception that the diodes 94 and 95 are oppositely poled relative to the corresponding amplifier 88. Therefore, irrespective of the polarity of the signal $Y_L$, circuit 86 produces negative polarity, absolute value output signals of $Y_L$.

If it is assumed that the coordinate planes of FIG. 7 are of a conventional form, it is apparent that the component $X_L$ can be positive as well as negative in dependence upon whether the component R is located to the left or right of the Y–Z plane. Similarly, the $Y_L$ component can be positive or negative in dependence upon whether the component R is located to the left or right of the X–Z plane. In the present embodiment and description, the component R is considered always to have a positive polarity; and, the polarity of the component $Z_L$ is positive when the target is above the horizontally disposed X–Y tangent plane and is negative whenever the target location is below this plane. Polarity transitions in the signals which correspond to the components $X_L$, $Y_L$ and $Z_L$ and to the components $X_R$, $Y_R$ and $Z_R$ are obtained directly and automatically from polar-to-Cartesian converters 11.

The signal selector switches SS1 through SS8 switch the $\epsilon_X$, $\epsilon_Y$ and $\epsilon_Z$ error signals in channels A, D and E according to Tables 3, 4 and 5. Channels D and E are each provided with 3 signal selector switches; channel A is provided with only 2 selector switches because $\epsilon_A$ is not a function of the error signal $\epsilon_Z$. Each of the switches SS1 through SS8 preferably comprise a coupling transformer 98, a switching transistor 100 and a diode decoding circuit. The modulated error signal $\epsilon_X$ is applied to one end of the primary winding of a coupling transformer 98 in each of the 3 channels. The modulated error signal $\epsilon_Y$ is similarly applied to one end of the primary winding of a coupling transformer 98 in each of the three channels. The error signal $\epsilon_Z$ is applied to one end of the primary winding of coupling transformers 98 in the channels D and E. The other end of each of the coupling transformer primary windings is connected directly to ground.

The transistors 100 each have their collector connected to one end of the secondary winding of a corresponding transformer 98. The emitter of each transistor 100 is preferably connected to ground. Within each channel the other ends of each secondary winding are connected in common to the input terminal of the corresponding amplifier 64. Each transistor 100 is normally biased to a condition of conduction via a suitable resistor 99 which is connected to a source of biasing potential, such as —15 volts. The switching signals for transistors 100 are delivered via a corresponding suitable resistor 101.

The switches SS1, SS4 and SS7 each receive input switching signals directly from the comparator output line CXYA via a similar positively conducting diode element 102. Switches SS2, SS3 and SS6 are each connected directly to the comparator output line CXYB via a similar positively conducting diode element 102. Switches SS3, SS4 and SS8 receive input signals from the comparator output line CZRB via a similar diode element 102. The comparator output line CZRA delivers input signals to the switches SS5, SS6 and SS7 via corresponding diodes 102.

The comparator CXY continuously compares the amplitude of D.C. signal $X_L$ with the amplitude of the D.C. signal $Y_L$ to produce the output signals appearing on output lines CXYA and CXYB. When $X_L$ is of greater amplitude than $Y_L$, the CXYA line is positive and the CXYB line is negative. When the opposite conditions of $X_L$ and $Y_L$ exist, the output signals appearing on the output lines CXYA and CXYB are negative and positive, respectively. Thus, the comparator CXY determines whether the local radar azimuth angle is greater than or less than 45°. To this end, comparator CXY switches the polarity of its output signals at azimuth angles of 45°, 135°, 225° and 315°.

The comparator CZR produces a negative signal on line CZRA when the amplitude of $Z_L$ is larger than the amplitude of R and a positive signal on this same line when $Z_L$ is of smaller amplitude than R. Accordingly, comparator CZR determines whether the local radar elevation angle E is greater than or less than 45° with respect to the local radar horizontal or tangent plane. In FIGS. 6a and 6b the variations in output signals from the comparators CXY and CZR with variations in azimuth angle are shown for radar elevation angles of less than and greater than 45°.

For purposes of illustration, consider briefly the operation of the channel A switches SS1 and SS2 in conjunction with FIGS. 6a and 6b for 360° of azimuth angle change when the elevation angle is less than 45°. From 315° to 45°, the line CXYA will be negative and the line CXYB will be positive. Accordingly, switch SS2 will present an open circuit to the input signal $\epsilon_Y$ and switch SS1 will present a closed circuit to the input signal $\epsilon_X$. A channel amplifier 64 thus receives as an input signal the A.C. error signal $\epsilon_X$. In the sector from 45° to 135°, the transistor 100 in switch SS2 conducts and the signal $\epsilon_Y$ is applied to amplifier 64. At 135° and continuing through 225°, the comparator output line CXYB is positive and $\epsilon_X$ is applied to amplifier 64. Line CXYA is positive in the sector from 225° to 315° and the signal $\epsilon_Y$ is applied to amplifier 64. Since, during this total period, the D.C. signal R is continuously applied to the A channel amplifier 64, output signals according to Table 4 will result. In a similar manner, it can be seen from FIGS. 6a and 6b output signals according to Tables 3 and 5 will result for channels D and E.

The A.C. output signals from the amplifiers 64 are now equal in amplitude to the error correcting signals $\epsilon_A$, $\epsilon_E$ and $\epsilon_D$ according to the Tables 3 to 5. These signals are capacitor coupled to the secondary center-tap of the corresponding transformer 70, as heretofore described, where the signals are altered in sign, i.e., phase, according to Tables 3 to 5. To this end, each end of each secondary winding of the transformers 70 is connected to the collector of a corresponding transistor 104. Each transistor 104 has a grounded emitter and receives input signals at its base from a switching amplifier 106. Switching amplifiers 106 may be similar to the push-pull amplifiers 72, i.e., produce a signal of one polarity on its upper output line for one condition of input signal and another or opposite polarity signal on this other output line for another condition of input signals.

The input terminal of each amplifier 106 is connected to a decoding circuit which comprises diodes and resistors connected as "and" gates in order to complete the circuits of the switches PC1 through PC6. The decoding circuit for switches PC1 and PC2 comprises a first "and" gate 108 which includes a positively conducting diode connected to the line CYA and a negatively conducting diode connected to the line CXYB. A second "and" gate 110 for switches PC1 and PC2 includes a positively conducting diode connected to the line CXB and a negatively conducting diode connected to the line CXYA. A pair of positively conducting diodes 112 are connected in common at one terminal and directly to the input terminal of corresponding amplifier 106. Each of this pair of diodes 112 receives an input signal from one of the "and" gates 108, 110.

Operating in conjunction with channel D are the switches PC3 and PC4 which include a first "and" gate 114 which is connected exactly in the manner of the "and" gate 108. A second "and" gate 116 for this channel is formed by a positively conducting diode connected to the line CXA and a negatively conducting diode connected to the line CXYA. A pair of positively conducting diodes 118 are connected in a manner similar to the diodes 112 and deliver signals from the "and" gates 114 and 116 to the amplifier 106 in channel D. A positive input signal may also be applied to this amplifier via the diode 120 which has a direct connection between the input terminal of D channel amplifier 106 and the line CZRB.

Channel E includes the switches PC5 and PC6. A negatively conducting diode 122 is connected between the input terminal of the corresponding amplifier 106 and the line CZRB. A positively conducting diode 124 forms an "and" gate 125 with the diode 122 and delivers input signals from the output of "and" gate 118 to the amplifier 106 in channel E. A negatively conducting diode 126, which is connected between the input of E channel amplifier 106 and ground, completes the circuit of the phase control switch unit 68. Each of the "and" gates in phase control switch unit 68 are so arranged that a positive signal must be applied to both of the diodes which comprise the gate in order to obtain a positive output voltage. By way of example, if the lines CYA and CXYB are both positive, "and" gate 108 will produce an output signal. With line CXYB positive, the corresponding diode in "and" gate 108 is back-biased and cannot conduct. If line CXYB is negative, the corresponding diode conducts and back-biases the diode in the "and" gate 112 which has a direct connection to the "and" gate 108. If a negative voltage appears on line CYA while a positive voltage is present on line CXYB, both diodes forming the "and" gate 108 are back-biased and neither one will conduct. The operation of the other "and" gates disposed within the phase control switch unit 68 are similar to that described with respect to the "and" gates in channel A.

Before proceeding with an illustration of the phase selection operation of switch unit 68, it is to be noted that the output signals from comparator CX are applied directly to the lines CXA and CXB. In the present embodiment, the CXA line is negative and the CXB line is positive for negative input signals $X_L$. The opposite conditions exist on the CXA and CXB lines when $X_L$ is positive. Comparator CY has a single output conductor CYA which is positive for negative $Y_L$ input signals and negative for positive $Y_L$ signals. The output signals occurring on the lines CXA, CXB and CYA are shown graphically in FIGS. 6a and 6b for 360° of azimuth angle variation and for elevation angles of less than and greater than 45°.

As should be apparent, the output signals from comparators CX and CY define the quadrant of the X–Y plane in which the rectangular coordinate R occurs. The output from comparator CXY further determines whether, within a selected quadrant, the component R is nearest to the X or nearest to the Y axis, i.e., in which half of a given quadrant it occurs. The output of comparator CZR determines whether D occurs at an elevation angle of greater than or less than 45°. Thus, the output of these comparators determines the position of the present target within 45° in elevation and azimuth.

Assuming that the local radar scanner has assumed an azimuth angle of 020° and an elevation angle of 020°, the comparator output lines CYA, CXYA, CXA and CZRB are each at −15 volts, the output lines CXYB and CXB are at +15 volts. With these voltages applied to the phase selector unit 68, all "and" gates will be disabled and none of the switching amplifiers will have a positive input signal. In their unswitched state, viz., without a positive input voltage, the amplifiers 106 will produce an output signal only on their lower output line and bias the lower of the two corresponding transistors 104 to a condition of conduction. The lower end of the secondary winding of each of the transformers 70 is grounded through these transistors and the output signals therefrom are considered to have a positive polarity. When an amplifier 106 receives a positive input signal from the "and" gates, a positive output signal is produced on its upper output line to establish a grounded terminal at the upper end of the secondary winding of the corresponding transformer 70. With the upper end of the secondary winding grounded, it is presumed that negative polarity azimuth, elevation, and/or range error signals are produced.

The A.C. error correcting signals $\epsilon_A$, $\epsilon_D$ and $\epsilon_E$ are applied from the transformers 70 to the corresponding servo motors at the local radar to effect a change in radar range, azimuth angle or elevation angle position. New output signals of $X_L$, $Y_L$, R and $Z_L$ are produced; these signals are compared with the corresponding signals being received from the remote radar site as heretofore described to continuously reposition the local radar system. Since the present positioning system will produce D.C. error signals of $\epsilon_X$, $\epsilon_Y$ and $\epsilon_Z$ only so long as differences exist between the remote and local signals, the local radar is on-target and can then be placed into an automatic tracking mode at the time that the D.C. error signals $\epsilon_X$, $\epsilon_Y$ and $\epsilon_Z$ are reduced to zero.

It will be understood by those skilled in the art that the above described detailed embodiment is meant to be merely exemplary and that it is susceptible to modifications and variations without departing from the spirit and scope of the invention. Therefore, the invention is not deemed to be limited except as defined by the appended claims.

We claim:

1. A control system for positioning a local radar systen on-target in response to target position intelligence acquired at a remote target-tracking radar site, comprising means for adjusting a local radar scanner in azimuth and elevation relative to a radar base, means movable to positions in synchronism with the azimuthal and elevational rotation of said radar scanner, means for generating target range electrical signals, means for adjusting the position of said target range electrical signal generating means, means for transforming the range signals and the elevation and azimuth positions of said movable means into a plurality of electrical signals in Cartesian coordinate form, means for delivering from the remote radar site a plurality of parallax corrected electrical signals defining the target position in Cartesian coordinate form, and means for comparing each Cartesian coordinate signal from said transforming means with a corresponding Cartesian coordinate signal from the remote radar site and producing range, azimuth and elevation signals in response thereto for application to the corresponding one of said adjusting means.

2. A control system for positioning a local radar on-target in response to target position intelligence acquired at a remote target-tracking radar site, comprising means for adjusting a local radar scanner in azimuth and elevation relative to a radar base, means movable to positions in synchronism with the azimuthal and elevational rotation of said radar scanner, means for generating signals proportional to target range including means for adjusting the position of said target range signal generating means, means for converting said range signals and the elevation and azimuth positions of said movable means into a plurality of D.C. signals in Cartesian coordinate form, means for delivering a plurality of parallax corrected D.C. signals from a remote radar site and defining the position of a target in Cartesian coordinate form, and means for comparing each Cartesian coordinate D.C. signal from said converting means with a corresponding delivered Cartesian coordinate D.C. signal and producing A.C. error signals which correspond to range, azimuth and elevation for application to the corresponding one of said adjusting means.

3. A control system for positioning a local radar on-target in response to target position intelligence acquired at a remote target-tracking radar site, comprising means for adjusting a local radar scanner in azimuth and elevation relative to a radar base, means movable to positions in synchronism with the azimuthal and elevational rotation of said radar scanner, means at said local radar for generating signals proportional to target range, means for adjusting the position of said target range generating means, means for converting said range signals and the elevation and azimuth positions of said movable means into a plurality of D.C. signals in Cartesian coordinate form, means for delivering a plurality of parallax corrected D.C. signals from the remote radar site and defining the target position in Cartesian coordinate form, means for comparing selected ones of the Cartesian coordinate D.C. signals from said converting means with corresponding delivered Cartesian coordinate D.C. signals and producing A.C. error signals in response thereto, and means for generating switching signals in response to the D.C. signals from said converting means for selectively connecting said A.C. error signals to said range, azimuth and elevation angle adjusting means.

4. A control system for positioning a local radar on-target in response to target position intelligence acquired at a remote target-tracking radar site; comprising means for adjusting a local radar scanner in azimuth and elevation relative to a radar base; means movable to positions in synchronism with the azimuthal and elevational rotation of said radar scanner; means at said local radar for generating $D_L$ signals which are proportional to target range, including means for adjusting the position of said target range generating means; means for converting said range signals and the elevation and azimuth positions of said movable means into D.C. Cartesian coordinate signals in the form of $X_L$, $Y_L$, $R_L$ and $Z_L$; wherein: $Z_L$ is the vertical component of the target range, $R_l$ is the horizontal component of the target range, $X_L$ is the east-west component of $R_L$ and $Y_L$ is the north-south component of $R_L$; means for delivering parallax corrected $X_R$, $Y_R$ and $Z_R$ D.C. signals from the remote radar site and defining the target position in Cartesian coordinate form;

wherein: $X_R$ is the east-west component of horizontal range, $Y_R$ is the north-south component of horizontal range and $Z_R$ is the vertical component of target range; means for comparing the $X_L$, $Y_L$ and $Z_L$ Cartesian coordinate D.C. signals from said converting means with the corresponding delivered Cartesian coordinate D.C. signals of $X_R$, $Y_R$ and $Z_R$ and producing A.C. error signals in X, Y and Z in response thereto; means for generating switching signals in response to the polarity and amplitude of the D.C. signals from said converting means for identifying the Cartesian coordinate quadrant in which the local target occurs; and means connected to said switching signal generating means and to said A.C. error signal producing means for selectively applying said X, Y or Z A.C. error signals to said adjusting means to affect readjustment of the position of said local radar scanner and range signal generating means.

5. A control system for positioning a local radar on-target according to claim 4 wherein means are provided for attenuating said A.C. error signals of X or Y in proportion to the amplitude of said $R_L$ signal prior to their application to said radar scanner azimuth adjusting means.

6. A control system for positioning a local radar on-target according to claim 4 wherein means are provided for attenuating said A.C. error signals of X, Y or Z in proportion to the amplitude of said $D_L$ signal prior to their application to said radar scanner elevation adjusting means.

7. A control system for positioning a local radar on-target according to claim 4 wherein means are provided between said radar scanner azimuth adjusting means and said A.C. error signal producing means for attenuating the A.C. error signals therefrom in proportion to the amplitude of said signal $R_L$, and wherein means are provided between said radar scanner elevation adjusting means and said A.C. error signal producing means for attenuating the A.C. error signals therefrom in proportion to the amplitude of said signal $D_L$.

8. A control system for positioning a local radar on-target in response to target position intelligence acquired at a remote target-tracking radar site; comprising means for adjusting a local radar scanner in azimuth angle and elevation angle relative to a radar base; means movable to positions in synchronism with the azimuthal and elevational rotation of said radar scanner means at said local radar for generating $D_L$ signals which are proportional to target range, including means for adjusting the position of said target range generating means; means for converting said range signals and the elevation angle and azimuth angle positions of said movable means into D.C. signals in a Cartesian coordinate form of $X_L$, $Y_L$, $R_L$ and $Z_L$; wherein: $Z_L$ is the vertical component of the target range, $R_L$ is the horizontal component of the target range, $X_L$ is the east-west component of $R_L$, and $Y_L$ is the north-south component of $R_L$; means for delivering parallax corrected $X_R$, $Y_R$ and $Z_R$ D.C. signals from the remote radar site and defining the target position in Cartesian coordinate form; wherein: $X_R$ is the east-west component of horizontal range, $Y_R$ is the north-south component of horizontal range and $Z_R$ is the vertical component of target range; means for comparing the $X_L$, $Y_L$ and $Z_L$ Cartesian coordinate D.C. signals from said converting means with the corresponding delivered Cartesian coordinate D.C. signals of $X_R$, $Y_R$ and $Z_R$ and producing A.C. error signals in X, Y and Z in response thereto; means for generating switching signals for identifying the Cartesian coordinate quadrant in which the local target occurs, including a first comparator circuit for producing one or an opposite polarity of output signal in response to a differential input of the signals $X_L$ and $Y_L$, and a second comparator circuit for producing one or an opposite polarity of output signal in response to a differential input of the signals $Z_L$ and $R_L$; and means connected to said first and second comparator circuits, to said switching signal generating means and to said A.C. error signal producing means for selectively applying said X, Y and Z A.C. error signals to said adjusting means, thereby to effect readjustment of the position of said local radar scanner and range signal generating means.

9. A control system for positioning a local radar on-target in response to target position intelligence acquired at a remote target-tracking radar site; comprising means for adjusting a local radar scanner in azimuth angle and elevation angle relative to a radar base; means movable to positions in synchronism with the azimuthal and elevational rotation of said radar scanner means at said local radar for generating $D_L$ signals which are proportional to target range including means for adjusting the position of said target range generating means; means for converting said range signals and the elevation angle and azimuth angle positions of said movable means into D.C. signals in a Cartesian coordinate form of $X_L$, $Y_L$, $R_L$ and $Z_L$; wherein: $Z_L$ is the vertical component of the target range, $R_L$ is the horizontal component of the target range, $X_L$ is the east-west component of $R_L$ and $Y_L$ is the north-south component of $R_L$; means for delivering parallax corrected $X_R$, $Y_R$ and $Z_R$ D.C. signals from the remote radar site and defining the target position on Cartesian coordinate form; wherein: $X_R$ is the east-west component of horizontal range, $Y_R$ is the north-south component of horizontal range and $Z_R$ is the vertical component of target range; means for comparing the $X_L$, $Y_L$ and $Z_L$ Cartesian coordinate D.C. signals from said converting means with the corresponding delivered Cartesian coordinate D.C. signals of $X_R$, $Y_R$ and $Z_R$ and producing A.C. error signals in X, Y and Z in response thereto; means for generating switching signals for identifying the Cartesion coordinate quadrant in which the local target occurs including a comparator circuit for producing one polarity of output signal whenever the $X_L$ signal is of greater amplitude than the $Y_L$ signal and for producing an opposite polarity of output signal whenever the amplitude of the $X_L$ signal is smaller than the amplitude of the $Y_L$ signal; and means connected to said comparator circuit, to said switching signal generating means, and to said A.C. error signal producing means for selectively applying said X, Y, and Z A.C. error signals to said adjusting means, thereby to effect readjustment of the position of said local radar scanner and range signal generating means.

10. A control system for positioning a local radar on-target in response to target position intelligence acquired at a remote target-tracking radar site; comprising means for adjusting a local radar scanner in azimuth angle and elevation angle relative to a radar base; means movable to positions in synchronism with the azimuthal and elevational rotation of said radar scanner means at said local radar for generating $D_L$ signals which are proportional to target range including means for adjusting the position of said target range generating means; means for converting said range signals and the elevation angle and azimuth angle positions of said movable means into D.C. signals in a Cartesian coordinate form of $X_L$, $Y_L$, $R_L$, and $Z_L$; wherein: $Z_L$ is the vertical component of the target range, $R_L$ is the horizontal component of the target range, $X_L$ is the east-west component of $R_L$, and $Y_L$ is the north-south component of $R_L$; means for delivering parallax corrected $X_R$, $Y_R$ and $Z_R$ D.C. signals from the remote radar site and defining the target position in Cartesian coordinate form; wherein: $X_R$ is the east-west component of horizontal range, $Y_R$ is the north-south component of horizontal range and $Z_R$ is the vertical component of target range; means for comparing the $X_L$, $Y_L$ and $Z_L$ Cartesian coordinate D.C. signal from said converting means with the corresponding delivered Cartesian coordinate D.C. signals of $X_R$, $Y_R$ and $Z_R$ and producing A.C. error signals in X, Y and Z in response thereto; means for generating switching signals for identifying the Cartesian coordinate quadrant in which the local target occurs including a comparator circuit for producing one polarity of output signal whenever the $R_L$ signal is of greater amplitude than the $Z_L$ signal and for producing an opposite polarity of output signal whenever the $R_L$ signal is of smaller amplitude than the $Z_L$ signal; and means connected to said comparator circuit, to said switching signal generating means, and to said A.C. error signal producing means for selectively applying said X, Y and Z A.C. error signals to said adjusting means, thereby to effect readjustment of the position of said local radar scanner and range signal generating means.

11. A control system for positioning a local radar on-target in response to target position intelligence acquired at a remote target-tracking radar site; comprising means for adjusting a local radar scanner in azimuth angle and elevation angle relative to a radar base; means movable to positions in synchronism with the azimuthal and elevational rotation of said radar scanner means to said local radar for generating $D_L$ signals which are proportional to target range, including means for adjusting the position of said target range generating means; means for converting said range signals and the elevation angle and azimuth angle positions of said movable means into D.C. signals in a Cartesian coordinate form of $X_L$, $Y_L$, $R_L$ and $Z_L$; wherein: $Z_L$ is the vertical component of the target range, $R_L$ is the horizontal component of the target range, $X_L$ is the east-west component of $R_L$ and $Y_L$ is the north-south component of $R_L$; means for delivering parallax corrected $X_R$, $Y_R$ and $Z_R$ D.C. signals from the remote radar site and defining the target position in Cartesion coordinate form; wherein: $X_R$ is the east-west component of horizontal range, $Y_R$ is the north-south component of horizontal range and $Z_R$ is the vertical component of target range; means for comparing the $X_L$, $Y_L$ and $Z_L$ Cartesian coordinate D.C. signals from said converting means with the corresponding delivered Cartesian coordinate D.C. signals of $X_R$, $Y_R$ and $Z_R$ and producing A.C. error signals in X, Y and Z in response thereto; a first comparator circuit for producing one or an opposite polarity of output signal in response to a differential input of the signals $X_L$ and $Y_L$; a second comparator circuit for producing one or an opposite polarity of output signal in response to a differential input of the signals $Z_L$ and $R_L$; a third comparator circuit for producing one or an opposite polarity of output signal in response to the polarity of the signal $X_L$; a fourth comparator for producing one or an opposite polarity of output signal in response to the polarity of the signal $Y_L$; means including a first, second and third amplifier circuits; means including a plurality of switching circuits which are operated in response to the output signals from said first and second comparator circuits for selectively connecting said A.C. error signals to the input terminals of said first, second and third amplifier means; mean at the input terminal of one of said amplifier means for attenuating the A.C. input signal thereto in proportion to the amplitude of said signal $R_L$; means at the input terminal of another of said amplifiers for attenuating the A.C. input signal thereto in proportion to the amplitude of said signal $D_L$; and means including a plurality of gate circuits operated in response to the output signals from said first, second, third and fourth comparator circuits for polarizing the output signals from said amplifier means and for applying the polarized output signals to the local radar scanner and range signal adjusting means.

No references cited.

CHESTER L. JUSTUS, *Primary Examiner.*